United States Patent
Grant et al.

(10) Patent No.: US 10,258,172 B2
(45) Date of Patent: Apr. 16, 2019

(54) SYSTEMS AND METHODS FOR ACQUIRING DATA FROM ARTICLES OF MERCHANDISE ON DISPLAY

(71) Applicant: InVue Security Products Inc., Charlotte, NC (US)

(72) Inventors: Jeffrey A. Grant, Charlotte, NC (US); Jonathon D. Phillips, Fort Mill, SC (US); Gary A. Taylor, Fort Mill, SC (US)

(73) Assignee: InVue Security products Inc., Charlotte, NC (US)

(*) Notice: Subject to any disclaimer, the term of this patent is extended or adjusted under 35 U.S.C. 154(b) by 0 days.

(21) Appl. No.: 15/549,294

(22) PCT Filed: Feb. 11, 2016

(86) PCT No.: PCT/US2016/017483
§ 371 (c)(1),
(2) Date: Aug. 7, 2017

(87) PCT Pub. No.: WO2016/130762
PCT Pub. Date: Aug. 18, 2016

(65) Prior Publication Data
US 2018/0035827 A1 Feb. 8, 2018

Related U.S. Application Data

(60) Provisional application No. 62/115,303, filed on Feb. 12, 2015.

(51) Int. Cl.
*A47F 7/024* (2006.01)
*G08B 13/14* (2006.01)
*H04W 4/70* (2018.01)

(52) U.S. Cl.
CPC .......... *A47F 7/024* (2013.01); *G08B 13/1418* (2013.01); *G08B 13/1445* (2013.01); *H04W 4/70* (2018.02)

(58) Field of Classification Search
CPC ......... H04W 4/005; H04W 4/70; A47F 7/024; G08B 13/1418; G08B 13/1445;
(Continued)

(56) References Cited

U.S. PATENT DOCUMENTS 8,077,037 B2 * 12/2011 Leyden .................. G08B 25/10
340/531
8,452,868 B2 * 5/2013 Shafer ................ G08B 13/2402
340/568.1

(Continued)

FOREIGN PATENT DOCUMENTS

WO 2014134718 A1 9/2014

OTHER PUBLICATIONS

International Search Report and Written Opinion from corresponding International Application No. PCT/2016/017483, dated May 2, 2016 (11 pages).

(Continued)

*Primary Examiner* — An T Nguyen
(74) *Attorney, Agent, or Firm* — InVue Security Products Inc.

(57) ABSTRACT

Embodiments of the present invention are directed to systems, devices, and methods for displaying and securing articles of merchandise. In one example, a merchandise security system includes a plurality of security devices, wherein each of the security devices includes a sensor configured to be attached to an article of merchandise. The system also includes at least one controller configured to communicate with each of the articles of merchandise in order to obtain data from the articles of merchandise. The (Continued)

controller and/or each of the security devices is configured to generate a security signal in response to removal of the sensor from the article of merchandise.

72 Claims, 4 Drawing Sheets

(58) Field of Classification Search
CPC ............ G08B 13/1454; G08B 13/1463; G08B 13/1409; G08B 13/06; G08B 13/12; G08B 13/14; G08B 13/2402
See application file for complete search history.

(56) References Cited

U.S. PATENT DOCUMENTS

| | | | |
|---|---|---|---|
| 8,558,688 B2* | 10/2013 | Henson | G06F 1/1626 340/539.1 |
| 8,564,438 B2* | 10/2013 | Fawcett | G08B 13/14 340/568.1 |
| 8,581,985 B2* | 11/2013 | Fawcett | G08B 13/1445 348/143 |
| 8,624,737 B2* | 1/2014 | Irmscher | A47F 3/002 340/562 |
| 9,443,404 B2* | 9/2016 | Grant | G08B 13/1445 |
| 9,659,472 B2* | 5/2017 | Fawcett | G08B 13/1445 |
| 9,786,140 B2 | 10/2017 | Henson et al. | |
| 9,818,274 B2* | 11/2017 | Fawcett | G08B 13/1481 |
| 10,002,506 B2* | 6/2018 | Baker | G08B 13/1445 |
| 10,062,250 B2* | 8/2018 | Grant | G08B 13/14 |
| 10,127,745 B2* | 11/2018 | Grant | G08B 13/1445 |
| 2005/0198077 A1 | 9/2005 | Van Der Heijden | |
| 2007/0150331 A1 | 6/2007 | Perri et al. | |
| 2007/0180234 A1 | 8/2007 | Labaton | |
| 2007/0194918 A1 | 8/2007 | Rabinowitz et al. | |
| 2010/0231388 A1* | 9/2010 | Shute | E05B 45/005 340/568.4 |
| 2011/0309934 A1 | 12/2011 | Henson et al. | |
| 2012/0055985 A1* | 3/2012 | Allen | G06Q 10/08 235/375 |
| 2012/0119910 A1* | 5/2012 | Belden, Jr. | G08B 13/1463 340/568.8 |
| 2012/0280810 A1* | 11/2012 | Wheeler | G08B 13/1445 340/539.11 |
| 2013/0108065 A1 | 5/2013 | Mullins et al. | |
| 2013/0132279 A1* | 5/2013 | Nordstrom | G08C 19/00 705/44 |
| 2013/0188044 A1 | 7/2013 | Tsou | |
| 2013/0238516 A1 | 9/2013 | Moock et al. | |
| 2013/0268316 A1* | 10/2013 | Moock | G06Q 30/0201 705/7.29 |
| 2013/0284806 A1* | 10/2013 | Margalit | G06Q 30/06 235/382 |
| 2014/0036074 A1 | 2/2014 | Fawcett et al. | |
| 2014/0172649 A1* | 6/2014 | Cancro | G06Q 10/087 705/28 |
| 2014/0172650 A1* | 6/2014 | Cancro | G06Q 10/087 705/28 |
| 2014/0266724 A1 | 9/2014 | Taylor | |
| 2014/0340225 A1 | 11/2014 | Grant et al. | |
| 2015/0235533 A1* | 8/2015 | Grant | G08B 13/1445 340/568.2 |
| 2016/0140820 A1* | 5/2016 | Joseph | G06Q 10/0833 340/572.1 |
| 2016/0196485 A1* | 7/2016 | Patterson | G06K 19/0723 340/572.1 |
| 2016/0307209 A1 | 10/2016 | Marszalek | |
| 2016/0308952 A1 | 10/2016 | Marszalek et al. | |
| 2017/0148288 A1* | 5/2017 | Baker | G08B 13/1445 |
| 2017/0164314 A1 | 6/2017 | Wylie et al. | |
| 2017/0193780 A1* | 7/2017 | Moock | G06Q 30/0201 |
| 2017/0206757 A1* | 7/2017 | Grant | G08B 13/14 |
| 2017/0221327 A1 | 8/2017 | Wu et al. | |
| 2017/0372543 A1* | 12/2017 | Grant | G08B 13/1445 |
| 2018/0007648 A1 | 1/2018 | Wylie et al. | |
| 2018/0025598 A1* | 1/2018 | Fawcett | G08B 13/1481 340/568.2 |
| 2018/0035827 A1* | 2/2018 | Grant | G08B 13/1445 |
| 2018/0061197 A1* | 3/2018 | Grant | G08B 13/1445 |
| 2018/0288720 A1 | 10/2018 | Blaser et al. | |
| 2018/0288721 A1 | 10/2018 | Blaser et al. | |
| 2018/0288722 A1 | 10/2018 | Blaser et al. | |

OTHER PUBLICATIONS

"J-Plug Pro: The Security and Screensaver App", <http://usa.multplx.com/products/jplug_pro_app/>, dated Nov. 4, 2014 (5 pages).
"My Monitor: For Multplx Apps", <http://usa.multplx.com/products/my_monitor/>, dated Nov. 4, 2014 (4 pages).
"Product Me", <http://www.stacey-europe.com/product-me.html>, dated Nov. 4, 2014 (2 pages).
U.S. Appl. No. 16/169,664, filed Oct. 24, 2018.
U.S. Appl. No. 16/245,332, filed Jan. 11, 2019.
Extended European Search Report from corresponding European Patent Application No. 16749856.7, dated Sep. 20, 2018 (7 pages).

* cited by examiner

SYSTEMS AND METHODS FOR ACQUIRING DATA FROM ARTICLES OF MERCHANDISE ON DISPLAY

CROSS REFERENCE TO RELATED APPLICATIONS

The present application is a national phase entry of International Application No. PCT/US2016/017483, filed Feb. 11, 2016, which claims priority to U.S. Provisional Application No. 62/115,303, filed Feb. 12, 2015, the contents of each of which are incorporated by reference herein in their entireties.

FIELD OF THE INVENTION

Embodiments of the present invention relate generally to merchandise display systems and methods, in particular, to systems and methods for acquiring data from articles of merchandise on display.

BACKGROUND OF THE INVENTION

Retailers routinely display articles of merchandise, such as phones, portable computers (e.g. notebooks, laptops, tablets, etc.), e-readers, media players, and the like for customers to evaluate before making a purchase. These articles of merchandise are continually being made smaller and lighter in weight due to advances in technology and materials. As a result, such merchandise is increasingly vulnerable and susceptible to theft. At the same time, the retail price and profit margin for such merchandise continues to decline. Accordingly, these articles of merchandise need to be secured by a security device that effectively and cost efficiently protects the merchandise from theft.

BRIEF SUMMARY

Embodiments of the present invention are directed to merchandise security systems and methods. According to one embodiment, a merchandise security system includes a plurality of security devices, wherein each of the security devices includes a sensor configured to be attached to an article of merchandise. The security system also includes at least one controller configured to communicate with each of the articles of merchandise in order to obtain data from the articles of merchandise, wherein the controller and/or each of the security devices is configured to configured to generate a security signal in response to removal of the sensor from the article of merchandise.

In another embodiment, a merchandise security device includes a security device including a sensor configured to be attached to an article of merchandise and a controller in communication with the security device. The controller is configured to communicate with a memory of the article of merchandise in order to obtain data from the article of merchandise.

According to one embodiment, a method for displaying and securing articles of merchandise is provided. The method includes communicating with a plurality of security devices, wherein each of the security devices includes a sensor configured to be attached to an article of merchandise. The method also includes obtaining data from each of the articles of merchandise and generating a security signal in response to removal of the sensor from the article of merchandise.

In another embodiment, a merchandise security system includes an article of merchandise comprising a memory and a security device in communication with the article of merchandise for preventing theft. The security device includes a controller, and the controller is configured to communicate with the memory of the article of merchandise in order to obtain data from the article of merchandise.

DETAILED DESCRIPTION

Embodiments of the present invention will now be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and multiple prime notations are used to indicate similar elements in alternative embodiments.

One or more embodiments of a system for displaying and securing an article of merchandise "M" are described below and shown. The article of merchandise M is typically a display model or an operational sample of electronic merchandise, such as portable telephones, smart phones, computers (e.g. notebooks, laptops, tablets, etc.), e-readers, media players, and the like, for a customer to examine before making a decision to purchase the item. The article of merchandise M is typically displayed in a manner that permits a prospective purchaser to evaluate the operation and features of the merchandise, while protecting the merchandise from a potential thief. In one embodiment, a sensor may be attached to the article of merchandise for detecting various alarming conditions, such as the article being removed from the sensor. In some embodiments, the security devices may be similar to PODs manufactured by InVue Security Products Inc. (e.g., Series 950, 1000, and 2000 PODs).

Figure 1:
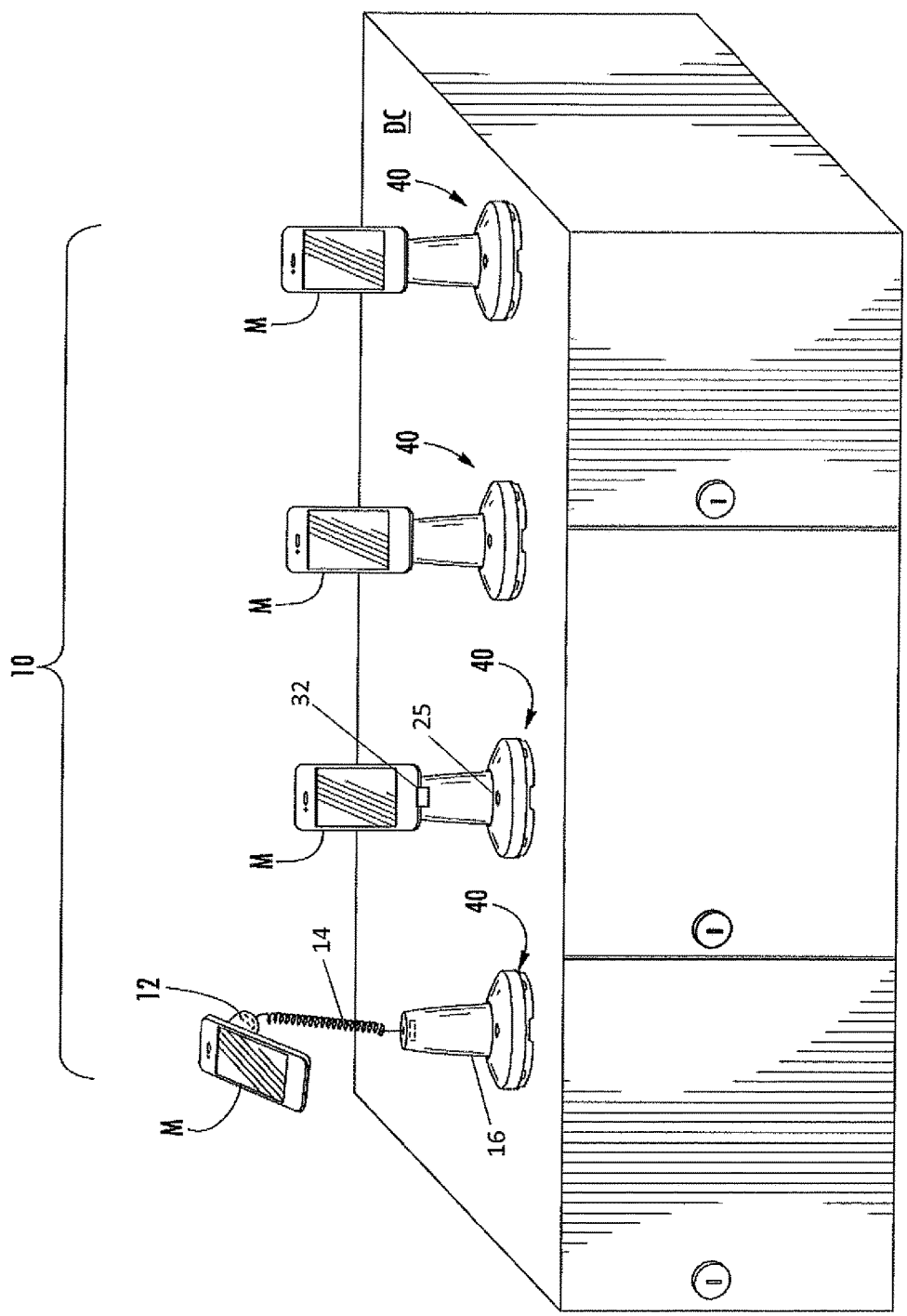
FIG. 1 illustrates a merchandise security system according to one embodiment of the present invention.
Figure 2:
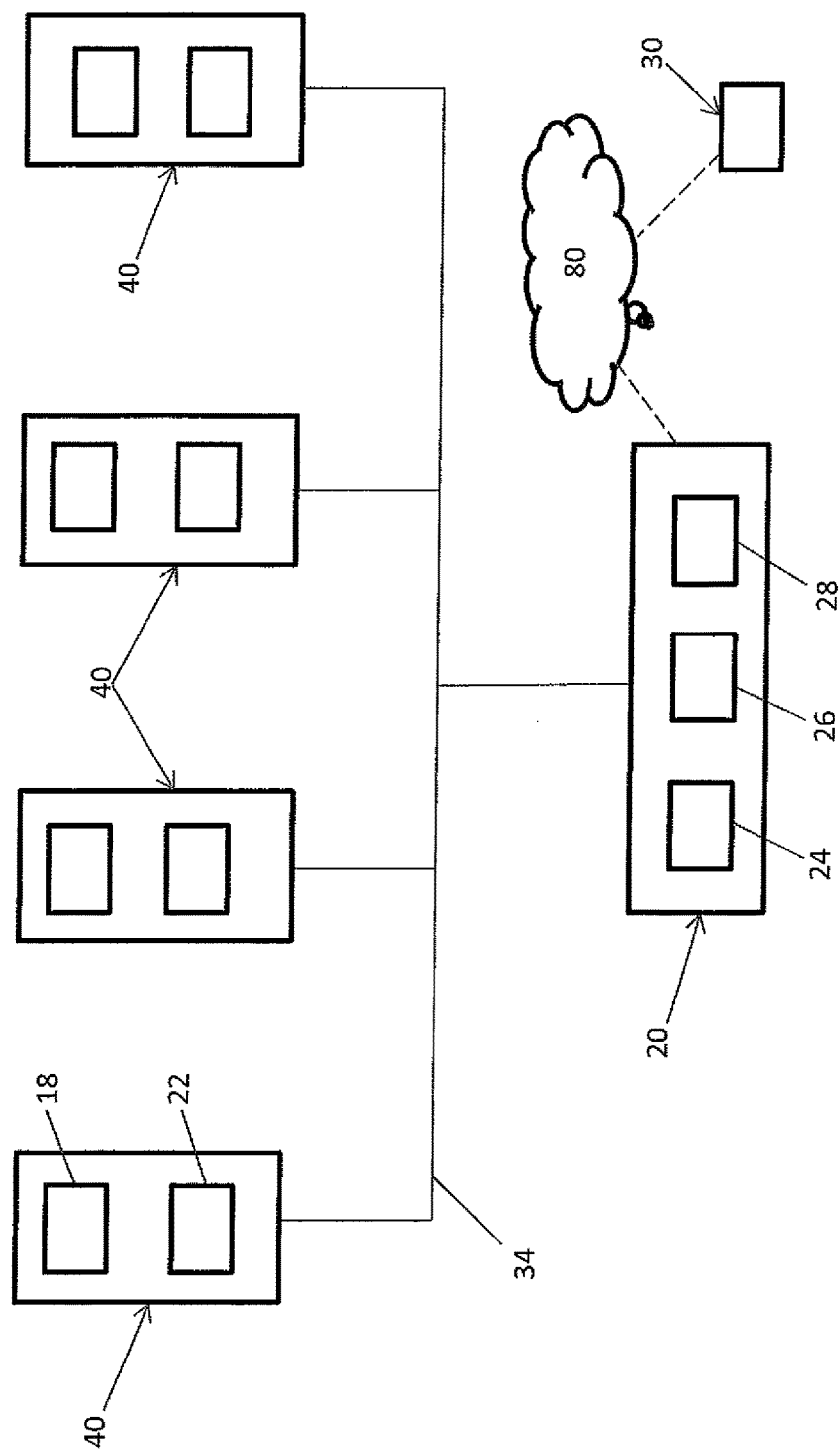
FIG. 2 is a schematic of a merchandise security system according to another embodiment of the present invention.

FIG. 1 illustrates an embodiment of a merchandise security system 10 for securing articles of merchandise M from theft or unauthorized removal. The system 10 generally includes one or more display positions, wherein each display position includes a security device 40 that is supported on a display counter "DC" (e.g., a counter, shelf, support, or the like). A security device 40 may generally include a sensor 12, a tether 14, and a base 16, although other arrangements may be contemplated (e.g., omitting the tether). The sensor 12 is configured to be secured to the article of merchandise M, such as with a pressure-sensitive adhesive and/or bracket arms. The sensor 12 is electrically connected to the tether 14, such as with a connector or via hardwiring. One end of the tether 14 may be electrically connected to the base 16, while the opposite end of the tether may be electrically connected to the sensor 12. The tether 14 and/or base 16 may be electrically connected to or otherwise in electrical communication with a controller 20, as explained in further detail below. In some embodiments, the tether 14 is electrically connected to a recoiler to allow the tether to extend and retract relative thereto. The recoiler may in turn be electrically connected to the controller 20. In other embodiments, the tether 14 is elastic or otherwise extendable and retractable relative to the base 16. Although four security devices are shown in FIGS. 1 and 2, it is understood that the controller 20 may be configured to communicate with any number of security devices, including one or more. Moreover, in some embodiments, one or more controllers 20 may be employed. In some embodiments, the controller 20 and the security devices 40 are independent of one another such that the controller may be positioned remotely from the security devices (e.g., under the display counter).

The base 16 is configured to removably support the sensor 12 thereon such that the sensor and article of merchandise M may be removed from the base for inspection and returned to the base. The base 16 may define an opening therethrough that allows the tether 14 to extend and retract relative to the base. It is understood that although a tethered embodiment is shown, it is understood that "tetherless" embodiments may also be utilized such as where the base 16 and the sensor 12 communicate wirelessly. For example, the base 16 and the sensor 12 may be configured to communicate wirelessly in order to ensure that the article of merchandise M is maintained within a predetermined location or distance relative to the base. In other embodiments, the article of merchandise M may be configured to be removably supported directly on the base 16 such that the sensor 12 may be integrated into the article. One example of wireless technology is disclosed in U.S. Pat. No. 8,878,673, entitled Systems and Methods for Protecting Retail Display Merchandise From Theft, the contents of which are hereby incorporated by reference in their entirety herein.

In some embodiments, the sensor 12 and/or base 16 may include alarming circuitry 18 or the like that is configured to determine whether various security events have occurred for generating a security signal, such as an audible and/or a visual alarm or signal (see, e.g., FIG. 2). The sensor 12 and/or base 16 may also include an alarm 22 (e.g., a piezoelectric device) that is configured to generate an audible alarm or signal. In some cases, the sensor 12 and/or base 16 may include a visual indicator (e.g., an LED) for emitting a visual signal when the alarming circuitry 18 is armed and/or alarming. Moreover, the sensor 12 and/or base 16 may include a transfer port 25 that is configured to communicate with a key for arming and/or disarming the alarming circuitry 18 (see, e.g., FIG. 1). In one embodiment, the transfer port 25 is configured to communicate wirelessly with a key in order to determine whether the key is authorized to arm and/or disarm the alarming circuitry 18. According to some embodiments, the key is similar to that described in U.S. Pat. No. 7,737,845, the contents of which are hereby incorporated by reference in their entirety herein. According to one embodiment, the sensor 12 may include a pressure switch or the like that is configured to detect when the article of merchandise M has been removed from the sensor. The alarming circuitry 18 may be configured to detect the removal of the article of merchandise M and/or cutting of the tether 14 and generate a security signal (e.g., an audible and/or a visual alarm) in response thereto.

The controller 20 may include a processor 24, CPU, or the like that is configured to facilitate communication with each of the security devices 40, both individually and collectively. For example, the controller 20 may be a digital interface box ("DIB") or a power interface box ("PIB") in some embodiments. The controller 20 may include communications circuitry 26 that is configured to transmit and receive signals and data from each of the security devices 40 and/or articles of merchandise M. The controller 20 may also include a memory 28 for storing various data regarding each of the security devices 40 and/or articles of merchandise M, as explained in further detail below. In one embodiment, the controller 20 is electrically connected to each of the security devices 40 via "wired" means, such as one or more electrical conductors 42. The controller 20 may be configured to transmit power to each of the security devices 40 and the articles of merchandise M via the electrical conductors 42. In other embodiments, the controller 20 and the security devices 40 may be configured to communicate with one another wirelessly. In order to provide power to the security devices 40, the security devices may utilize wireless power functionality, such as electrical contact or inductive charging technology. In addition, the controller 20 may be configured to transmit and/or regulate the voltage provided to each of the security devices 40 and/or articles of merchandise M. For example, the controller 20 may be in electrical communication with an input power source 46 and configured to transmit power at the appropriate voltage to each of the security devices 40 and the articles of merchandise M. Furthermore, it is understood that although the base 16 and controller 20 may be separate components in some embodiments, the base and controller may be integrated as a single component in other embodiments. For instance, the controller 20 may be housed in the base 16, and each base may include a respective controller.

In some embodiments, the controller 20 is configured to obtain data from the articles of merchandise M. For example, the data may be stored in a memory of the article of merchandise M, and the controller 20 may obtain at least a portion of the stored data. In some cases, the article of merchandise M may transmit the data from its internal memory to a sensor 12, controller 20, or any other desired device. The same controller 20 can communicate with the security devices 40 and the articles of merchandise, although it is understood that more than one controller could be employed, with separate controllers communicating with the security devices and articles of merchandise. The controller 20 may be configured to obtain the data directly or indirectly from the articles of merchandise. For example, each sensor 12 may be configured to communicate with a respective article of merchandise attached thereto to obtain data and subsequently communicate the data to the controller 20. In other embodiments, the controller 20 may receive the data directly from the articles of merchandise M. In some cases, the data is the type of article of merchandise M attached to a sensor 12 (e.g., a manufacturer and model of an article of merchandise). The type of article of merchandise M may allow the controller 20 to determine the power requirements of the specific type of article prior to sending power to the device. It is understood that various types of data and information may be obtained from the article of merchandise such as, for example, the number of "pulls" or "pickups" of a particular article of merchandise relative to the base, the type of article, the location of the article, the power status of the article, retail store information and location, the occurrence and time of a power loss to the security device, a key ID, number and time of interactions with a key, etc. Thus, the controller 20 may obtain data periodically or in real time, or a user could use a remote device 30 to request information regarding a specific article(s) of merchandise M by communicating with the controller 20. Additional examples of types of data that may be collected in response to interaction with the article of merchandise may be found, for example, in U.S. application Ser. No. 13/856,664, entitled Merchandise User Tracking System and Method, the contents of which is hereby incorporated by reference in their entirety herein.

In some advantageous embodiments, the controller 20 is configured to obtain data from the articles of merchandise M using a conventional tether 14. That is, the controller 20 is able to obtain data from the articles of merchandise M without increasing the number of conductors 42 extending through a conventional tether 14. For example, the tether 14 may include a plurality of conductors for power 42A (e.g., for powering the article of merchandise M), sense 42B (e.g., for detecting a security event), and data 42D (e.g., for obtaining data from the article of merchandise). In some embodiments, the controller 20 may act as a "host" while the sensor 12, base 16, and/or article of merchandise M acts as a "slave". In this instance, the controller 20 is able to obtain data from any of the associated "slave" devices. In one embodiment, data may be obtained using a dual mode where data can be obtained between providing power and sense via the controller 20. For instance, data may be obtained periodically and power and/or sensing may be paused for predetermined time periods in order to obtain data from the article of merchandise. In one embodiment, the controller 20 may be directly connected to the article of merchandise M, either via wired or wireless connection.

In another embodiment, an adapter cable or connector 32 may connect the sensor 12 to the article of merchandise M for transmitting power and other signals between the sensor and the article. The sensor 12 and/or controller 20 may be configured to detect when the adapter cable 32 is engaged with the article of merchandise M and send any data to the controller 20. The adapter cable 32 may also facilitate power transfer to the article of merchandise via the controller 20. In one embodiment, when no power is being provided to the article of merchandise M, data can be obtained with the controller 20 by isolating an LED on the adapter cable 32. The LED may be used to indicate a status of the article of merchandise (e.g., armed or powering). For example, when power is removed, the LED may illuminate, and one of the data lines connects to the LED allowing data to be obtained from the article of merchandise M.

Figure 3:
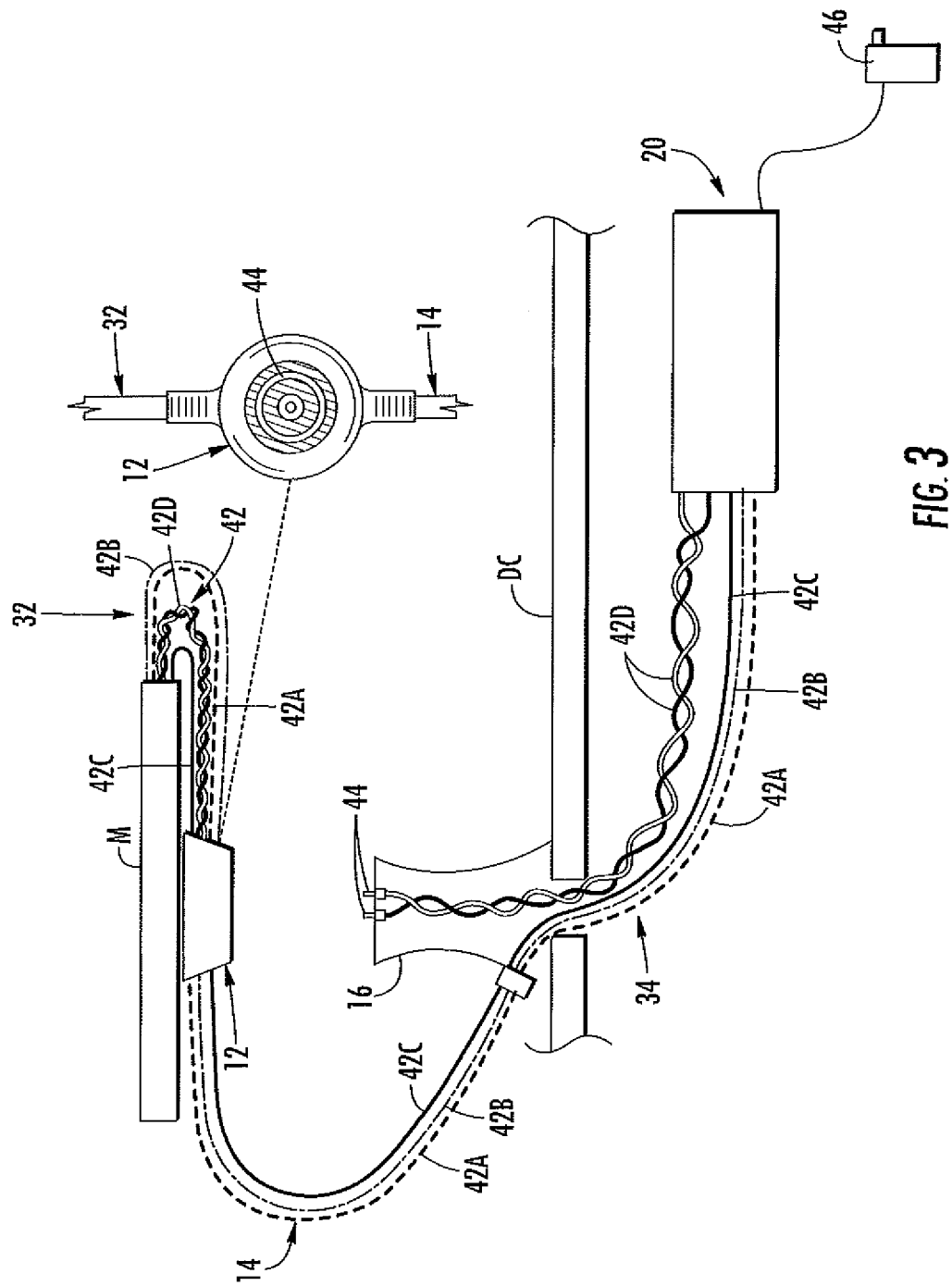
FIG. 3 is a schematic of a merchandise security system according to another embodiment.
Figure 4:
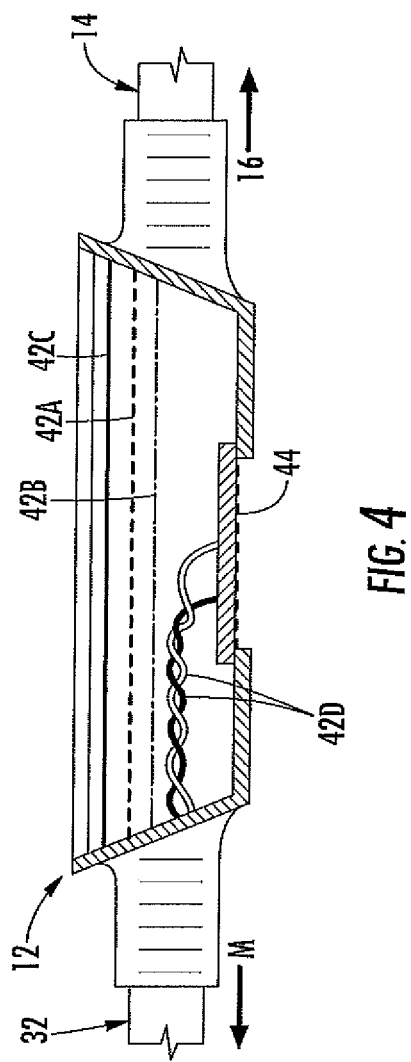
FIG. 4 is an enlarged view of a sensor shown in FIG. 3.

In another embodiment, the adapter cable 32 may include a plurality of conductors 42 for power, sense, and data. In one non-limiting example, five conductors may be used (one for power 42A, ground 42C, and sense 42B, and two for data 42D). Another cable 34 may be provided between the base 16 and the controller 20, wherein this cable may include the same number of conductors 42 as the adapter cable 32. Alternatively, the conductors 42 may be at least partially provided in the tether 14. When the sensor 12 is resting on the base 16, data may be provided from the article of merchandise to the controller 20 via the data conductors 42D in the adapter cable 32 and the cable 34. In some cases, the adapter cable 32 and cable 34 may not be electrically connected when the sensor 12 lifted from the base 16. Thus, the sensor 12 and base 16 may include conductors 44 that mate with one another, and electrically connect the cables 32, 34, when the sensor is resting on the base. An example of this technique is shown in FIGS. 3-4. In this example, the sensor 12 includes conductors 44, such as copper traces, that mate with conductors on the base 16, such as spring contacts or pogo pins. The electrical connection between the conductors 44 allows data to pass from the article of merchandise M to the controller 20 via the data conductors 42D in the cables.

In some embodiments, the controller 20 may be configured to communicate with a remote device 30, such as a retailer's laptop, tablet, or other electronic device through a cloud network 80. In one example, the remote device 30 may be a retailer's electronic device for managing various data received from one or more controllers 20. In one particular embodiment, a plurality of controllers 20 and/or security devices 40 are configured to communicate with one or more retailer's electronic devices over the network 80. For instance, the cloud network 80 may facilitate communication with a plurality of tablet devices used by sales associates within a retail environment. Communication over the network 80 may occur wirelessly. It is understood that the remote device 30 and the controller 20 may communicate with any desired means, such as cellular networks, Wi-Fi, radiofrequency, Bluetooth communication, and the like. The controller 20 and/or the remote device 30 may include communications circuitry or a transceiver that is configured to facilitate such communication with one another. One or more gateways and/or nodes may be used to facilitate communication between the controller 20 and the retailer's electronic device(s). For instance, a gateway (e.g., a router) between the controller 20 and the cloud network 80 may be configured to facilitate communication with a retailer's gateway and may be configured to allow the retailer to provide and receive data from the system 10. The retailer may be able to direct various commands via the cloud network 80 such as, for example, ensuring planogram compliance and tracking system usage. In some embodiments, such commands could include requesting data from the controller 20, powering up or down one or more articles of merchandise M, performing a roll call of one or more articles of merchandise (either at a particular time or after an alarming event), determining a location of an alarming security device 40, identifying a specific key that armed/disarmed/locked/unlocked a particular security device, remotely enabling or disabling an article of merchandise, remotely locking down an article of merchandise, checking the power status of an article of merchandise, tracking usage of an article of merchandise, tracking one or more article of merchandise (e.g., via serial number or other ID), assigning particular keys to authorized users, and/or directing a camera to record the location of an alarming security device. As such, a retailer may be able to more effectively manage any number of features regarding one or more security devices 40.

In another embodiment, the article of merchandise M may include a "subfolder" in memory that is configured to store various information, such as the article merchandise ID, a base ID, a controller ID, etc. In the instance where the controller 20 is configured to connect to a plurality of articles of merchandise M via a hub and a plurality of ports, the subfolder may store information regarding the location of the hub and ports, which may be used to correlate the articles of merchandise with its location. In addition, the article of merchandise M may be configured to store various data in the subfolder, such as the types of data discussed above. The subfolder may be created via a software application on the article of merchandise M, or the controller 20 may be configured to create a subfolder upon connection to the article of merchandise and detecting that no subfolder exits. For instance, connecting an adapter cable 32 to the article of merchandise M (e.g., via a USB connector in an input port of the article) may initiate detection and creation of a subfolder. In other embodiments, the subfolder may be created at a BIOS level in the article of merchandise M, wherein a custom ROM may be installed.

The controller 20 may be configured to obtain the data from the subfolder stored in the article of merchandise M. In this way, correlation between the articles of merchandise M, sensors 12, and bases 16 may be more easily determined since the data can be stored directly in the article of merchandise. In some cases wherein the article of merchandise M is paired or otherwise associated with a particular sensor 12 and/or base 16, the controller 20 will know if an incorrect article of merchandise has been attached to a sensor 12 and/or placed on a base 16. The controller 20 may immediately notify a sales associate via a security signal, such as via an audible and/or a visible signal or send data directly to a sales associate's remote device 30. In one embodiment, the article of merchandise M may store information in a subfolder in a real-time basis, such as for tracking a location of the article of merchandise M. The location of the article of merchandise M may be obtained using various techniques (e.g., GPS on the article of merchandise). In some embodiments, the article of merchandise M may determine its location using one or more techniques discloses in U.S. Pat. No. 8,878,673, entitled Systems and Methods for Protecting Retail Display Merchandise from Theft, the contents of which are hereby incorporated by reference in their entirety herein. In another embodiment, the article of merchandise M may be configured to communicate with the sensor 12 and/or controller 20, and if the tether 14 and or adapter cable 32 is cut, the article of merchandise may begin tracking its location and in some cases storing its location in the subfolder and/or communicating its location to a remote device 30. Where the tether 14 is cut, the controller 20 may be configured to store a time and date of the security event such that there will always be a record stored in the controller or the article of merchandise. In some cases, the article of merchandise M may be configured to communicate data to the controller 20 and/or remote device 30 via wireless communication (e.g., Bluetooth).

In an alternative embodiment, the article of merchandise M may be directed to a specific webpage for requesting various information from the article. Thus, rather than employing a subfolder for storing information, the article of merchandise M may be prompted to extract the information and either store the information in its memory or provide it to the controller 20 and/or remote device 30.

In another embodiment, connection of the adapter cable 32 may include a USB-type connector (e.g., USB-A, micro-USB, or USB-C) and engaging the connector with the article of merchandise M may initiate a request from the sensor 12 and/or controller 20 for a USB-identifier from the article. The USB-identifier may provide various information regarding the article of merchandise M, such as the model and/or serial number of the article. In some cases, the USB-identifier may only provide general information regarding the manufacturer of the article of merchandise M. In this case, the USB-identifier may be used to select a language protocol for more specifically identifying the article of merchandise. For instance, if the USB-identifier is for a Samsung device, the sensor 12 and/or controller 20 may initiate a protocol specific to Samsung to in turn request specific information from the article of merchandise M, such as the type or model of the article. Different protocols and/or requests may be used for different manufacturers. In one embodiment, the USB-identifier may be used to determine planogram compliance, e.g., that the articles of merchandise M are located in their assigned locations in a retail store. For example, each article of merchandise M may have a unique USB-identifier that may be associated with a particular location during initial set up. If the USB-identifiers are later requested, and a USB-identifier does not match the previous location, then the retailer will know that an article of merchandise is out of position.

Many modifications and other embodiments of the invention will be readily apparent to one skilled in the art having the benefit of the teachings presented in the foregoing descriptions and the associated drawings. Therefore, it is understood and appreciated that the invention is not to be limited to the specific embodiments disclosed herein, and that modifications to the disclosed embodiments and other undisclosed embodiments are intended to be included within the scope of the appended claims.

That which is claimed is:

1. A merchandise security system comprising:
a plurality of security devices, each of the security devices comprising a sensor, each sensor configured to be attached to an article of merchandise having a memory; and
at least one controller configured to obtain data from: (i) the memories of the articles of merchandise via the respective sensor attached thereto and (ii) the plurality of security devices, the data comprising at least identification information for each of the articles of merchandise and the plurality of security devices,
wherein each of the security devices is configured to generate a security signal in response to a security event,
wherein the at least one controller is configured wirelessly communicate the data and information regarding a location of each of the plurality of security devices to a remote electronic device.

2. The merchandise security system of claim 1, wherein the data comprises a type and/or power requirement of the article of merchandise.

3. The merchandise security system of claim 1, wherein the at least one controller is configured to provide electrical power to each of the security devices.

4. The merchandise security system of claim 1, wherein the at least one controller and/or each sensor comprises alarming circuitry for generating an audible and/or a visual signal in response to removal of the article of merchandise from the sensor.

5. The merchandise security system of claim 1, further comprising a base for removably supporting the sensor and the article of merchandise thereon.

6. The merchandise security system of claim 5, wherein each of the security devices further comprises a tether electrically connecting the sensor and the base, and wherein each tether is configured to transmit power, sense, and data signals.

7. The merchandise security system of claim 6, wherein each of the security devices further comprises an adapter cable electrically connecting the sensor and the article of merchandise, wherein each adapter cable is configured to transmit power, sense, and data signals.

8. The merchandise security system of claim 5, further comprising a plurality of controllers, wherein each controller is integrated with a respective base.

9. The merchandise security system of claim 1, further comprising at least a first controller and a second controller, wherein the first controller is configured to communicate with at least one of the security devices, and wherein the second controller is configured to communicate with at least one of the articles of merchandise.

10. A method for displaying and securing articles of merchandise, the method comprising:

communicating with a plurality of security devices, each of the security devices comprising a sensor configured to be attached to an article of merchandise having a memory;

obtaining data from each of: (i) the memories of the articles of merchandise via the respective sensor attached thereto and (ii) the plurality of security devices, the data comprising at least identification information for each of the articles of merchandise and the plurality of security devices; and generating a security signal with one or more of the plurality of security devices in response to a security event; and wirelessly communicating the data and information regarding a location of each of the plurality of security devices to a remote electronic device.

11. The method of claim 10, further comprising providing the data over a wireless network.

12. The method of claim 10, wherein obtaining comprises obtaining a type or power requirement of each of the articles of merchandise.

13. The method of claim 10, further comprising wirelessly communicating with the remote electronic device for providing the data.

14. The method of claim 10, wherein obtaining comprises obtaining data stored in a respective subfolder in each of the articles of merchandise.

15. The merchandise security system of claim 1, wherein the at least one controller is configured to communicate directly with each of the articles of merchandise for obtaining the data.

16. The merchandise security system of claim 1, wherein the at least one controller is configured to wirelessly communicate with each of the articles of merchandise for obtaining the data.

17. The merchandise security system of claim 5, wherein the sensor and the base each comprises at least one conductor configured to contact one another when the sensor is seated on the base and is configured to transfer data via the contacts when the sensor is seated on the base.

18. The merchandise security system of claim 1, further comprising a computer program product configured to be executed by each of the articles of merchandise for storing the data in memory.

19. The merchandise security system of claim 1, wherein each of the security devices further comprises an adapter cable having a USB-type connector for electrically connecting the sensor and the article of merchandise, and wherein the at least one controller is configured to obtain the identification information for the article of merchandise in response to the connection of the adapter cable.

20. The merchandise security system of claim 1, wherein the identification information for each of the articles of merchandise comprises a manufacturer and a model of each of the articles of merchandise.

21. The merchandise security system of claim 1, wherein the data comprises data regarding customer interaction with each of the articles of merchandise.

22. The merchandise security system of claim 1, wherein the data comprises data regarding security events associated with any one of the plurality of security devices.

23. The merchandise security system of claim 1, wherein each of the plurality of security devices further comprises a tether electrically connecting the sensor and the at least one controller, and wherein the tether is configured to transmit the data from the article of merchandise via the tether.

24. The merchandise security system of claim 1, wherein the at least one controller is configured to wirelessly communicate the data to the remote electronic device over a cloud network.

25. The merchandise security system of claim 1, wherein each of the articles of merchandise and/or the plurality of security devices is configured to receive commands wirelessly from the remote electronic device.

26. The merchandise security system of claim 1, wherein the controller is configured to wirelessly communicate the data to the remote electronic device for correlating the identifying information of the articles of merchandise with the locations of the plurality of security devices.

27. The merchandise security system of claim 1, wherein the controller is configured to associate the identifying information of the articles of merchandises with the locations of the plurality of security devices.

28. The merchandise security system of claim 1, wherein the controller is configured to pair the articles of merchandise with a respective security device.

29. The merchandise security system of claim 1, wherein the controller is configured to pair the articles of merchandise with respective sensors.

30. The merchandise security system of claim 5, wherein the controller is configured to pair the articles of merchandise with respective bases.

31. The merchandise security system of claim 1, wherein the controller is configured to wirelessly communicate the data to the remote electronic device for determining planogram compliance based on the data.

32. The merchandise security system of claim 1, wherein the data comprises a date and time of the security event.

33. The merchandise security system of claim 1, wherein the security event is a removal of one of the sensors from a respective article of merchandise.

34. The merchandise security system of claim 1, wherein the controller is configured to provide a notification in response to any one of the articles of merchandise being at an incorrect location.

35. The merchandise security system of claim 1, wherein the data comprises a power status of the articles of merchandise and the plurality of security devices.

36. The merchandise security system of claim 1, wherein the data comprises a date and time that each of the plurality of security devices interacts with a key.

37. The method of claim 10, further comprising receiving a command wirelessly from the remote electronic device.

38. The method of claim 37, wherein receiving comprising receiving a command to control one or more of the plurality of security devices.

39. The method of claim 10, further comprising correlating the identifying information of the articles of merchandise with the locations of the plurality of security devices.

40. The method of claim 10, further comprising pairing the articles of merchandise with a respective security device.

41. The method of claim 10, further comprising pairing the articles of merchandise with respective sensors.

42. The method of claim 10, further comprising pairing the articles of merchandise with a respective base, each base configured to removably support a respective sensor and article of merchandise thereon.

43. The method of claim 10, further comprising determining planogram compliance based on the data.

44. The method of claim 10, further comprising storing a date and time of the security event.

45. The method of claim 10, further comprising providing a notification in response to any one of the articles of merchandise being at an incorrect location.

46. The method of claim 10, further comprising storing a power status of the articles of merchandise and the plurality of security devices.

47. The method of claim 10, further comprising storing a date and time that each of the plurality of security devices interacts with a key.

48. A merchandise security system comprising:
   a plurality of security devices each configured to secure an article of merchandise from theft, each of the plurality of security devices comprising a sensor configured to be attached to an article of merchandise having a memory; and
   at least one controller configured to obtain data from: (i) the memories of the articles of merchandise via the respective sensor attached thereto and (ii) the plurality of security devices, the data comprising at least identification information for each of the articles of merchandise and the plurality of security devices,
   wherein the at least one controller is configured to associate the articles of merchandise and the security devices with one another based on the data and to communicate the data and information regarding a location of each of the plurality of security devices to a remote electronic device.

49. The merchandise security system of claim 1, wherein the information regarding the location of each of the plurality of security devices comprises information regarding an assigned location of the article of merchandise.

50. The merchandise security system of claim 48, wherein the information regarding the location of each of the plurality of security devices comprises information regarding an assigned location of the article of merchandise.

51. The merchandise security system of claim 48, wherein the data comprises a type and/or power requirement of the article of merchandise.

52. The merchandise security system of claim 48, wherein the at least one controller and/or each sensor comprises alarming circuitry for generating an audible and/or a visual signal in response to removal of the article of merchandise from the sensor.

53. The merchandise security system of claim 48, wherein the controller is configured to pair the articles of merchandise with respective sensors.

54. The merchandise security system of claim 48, wherein each of the security devices further comprises an adapter cable having a USB-type connector for electrically connecting the sensor and the article of merchandise, and wherein the at least one controller is configured to obtain the identification information for the article of merchandise in response to the connection of the adapter cable.

55. The merchandise security system of claim 48, wherein the at least one controller is configured to provide electrical power to each of the security devices.

56. The merchandise security system of claim 48, wherein the at least one controller is configured to communicate directly with each of the articles of merchandise for obtaining the data.

57. The merchandise security system of claim 48, wherein the at least one controller is configured to wirelessly communicate with each of the articles of merchandise for obtaining the data.

58. The merchandise security system of claim 48, further comprising a computer program product configured to be executed by each of the articles of merchandise for storing the data in the memory.

59. The merchandise security system of claim 48, wherein the identification information for each of the articles of merchandise comprises a manufacturer and a model of each of the articles of merchandise.

60. The merchandise security system of claim 48, wherein the data comprises data regarding customer interaction with each of the articles of merchandise.

61. The merchandise security system of claim 48, wherein the data comprises data regarding security events associated with any one of the plurality of security devices.

62. The merchandise security system of claim 48, wherein the at least one controller is configured to wirelessly communicate the data to the remote electronic device over a cloud network.

63. The merchandise security system of claim 48, wherein each of the articles of merchandise and/or the plurality of security devices is configured to receive commands wirelessly from the remote electronic device.

64. The merchandise security system of claim 48, wherein the controller is configured to wirelessly communicate the data to the remote electronic device for correlating the identifying information of the articles of merchandise with the locations of the plurality of security devices.

65. The merchandise security system of claim 48, wherein the controller is configured to associate the identifying information of the articles of merchandises with the locations of the plurality of security devices.

66. The merchandise security system of claim 48, wherein the controller is configured to pair the articles of merchandise with a respective security device.

67. The merchandise security system of claim 48, wherein each of the plurality of security devices comprises a base for supporting a respective article of merchandise thereon, wherein the controller is configured to pair the articles of merchandise with respective bases.

68. The merchandise security system of claim 48, wherein the controller is configured to wirelessly communicate the data to the remote electronic device for determining planogram compliance based on the data.

69. The merchandise security system of claim 48, wherein the data comprises a date and time of the security event.

70. The merchandise security system of claim 48, wherein the controller is configured to provide a notification in response to any one of the articles of merchandise being at an incorrect location.

71. The merchandise security system of claim 48, wherein the data comprises a power status of the articles of merchandise and the plurality of security devices.

72. The merchandise security system of claim 48, wherein the data comprises a date and time that each of the plurality of security devices interacts with a key.

* * * * *